(12) United States Patent
Kinjo

(10) Patent No.: US 6,728,428 B1
(45) Date of Patent: Apr. 27, 2004

(54) IMAGE PROCESSING METHOD

(75) Inventor: Naoto Kinjo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/253,003

(22) Filed: Feb. 19, 1999

(30) Foreign Application Priority Data

Feb. 23, 1998 (JP) .......................................... 10-040143

(51) Int. Cl.[7] ................................................ G06K 9/03
(52) U.S. Cl. ........................... 382/309; 348/64; 348/96; 348/231.6; 358/461; 358/462; 358/518; 358/527; 382/112; 382/167; 382/274; 396/311; 396/319
(58) Field of Search ................................ 382/299, 309, 382/321, 322, 112, 167, 169, 274; 348/64, 231, 232, 96, 344; 396/429.1, 311, 313, 319, 57; 358/1.9, 447, 448, 461, 462, 500, 518–520, 527

(56) References Cited

U.S. PATENT DOCUMENTS

| | | | | |
|---|---|---|---|---|
| 5,448,372 A | * | 9/1995 | Axman et al. | 358/342 |
| 5,606,630 A | * | 2/1997 | Maeda et al. | 382/254 |
| 5,751,343 A | * | 5/1998 | Hibino et al. | 348/96 |
| 5,828,442 A | * | 10/1998 | Wess | 355/40 |
| 5,845,166 A | * | 12/1998 | Fellegara et al. | 396/429 |
| 5,850,253 A | * | 12/1998 | Inoue et al. | 348/96 |
| 6,064,427 A | * | 5/2000 | Shiota et al. | 348/96 |
| 6,104,885 A | * | 8/2000 | McIntyre et al. | 396/319 |
| 6,211,974 B1 | * | 4/2001 | Haneda | 358/527 |

FOREIGN PATENT DOCUMENTS

JP          6-253147          9/1994

* cited by examiner

Primary Examiner—Bhavesh M. Mehta
Assistant Examiner—Gregory Desire
(74) Attorney, Agent, or Firm—Birch, Stewart, Kolasch & Birch, LLP

(57) ABSTRACT

An image processing method including the steps of: acquiring scene information which is previously tagged on to image data supplied from an image data supply source together with the image data; and setting image processing conditions in accordance with the scene information using the image data, and/or setting an image sequence in a plurality of images to be recorded on an index print in accordance with the scene information; and producing the index print on which the plurality of the images are recorded in accordance with the image sequence. The method provides a digital image processing method that is particularly suitable for use with digital photoprinters and which can process image data under optimal conditions that are adapted to specific scenes in images such as the one recorded on films. As a result, the method can produce high-quality prints that reproduce optimal images for various scenes.

10 Claims, 5 Drawing Sheets

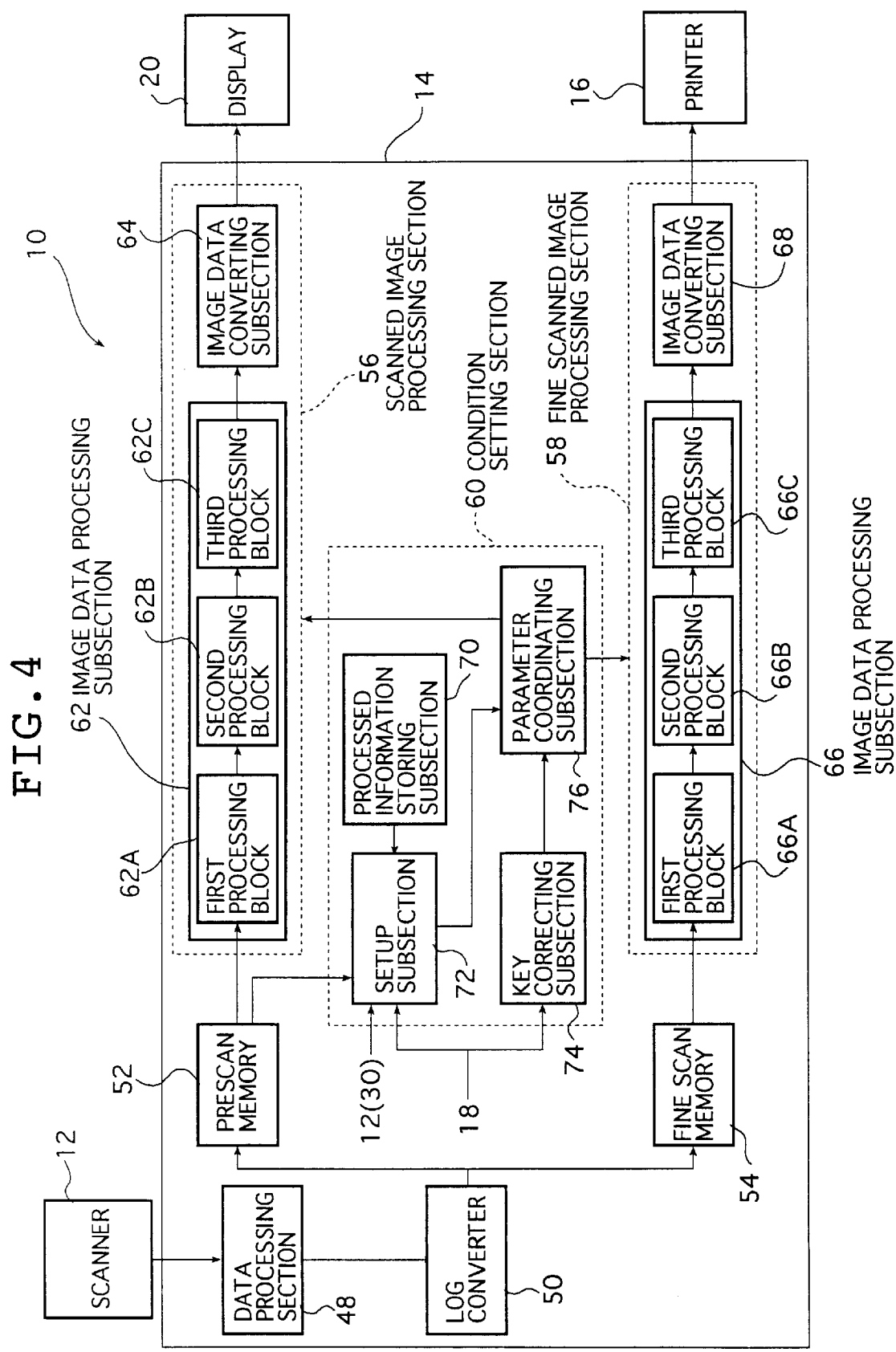

IMAGE PROCESSING METHOD

BACKGROUND OF THE INVENTION

This invention relates to the field of image processing technology for typical use with digital photoprinters that read film images photoelectrically to produce prints (photographs) reproducing the images.

Heretofore, the images recorded on photographic films such as negatives and reversals (which are hereunder referred to simply as "films") have been commonly printed on light-sensitive materials (photographic paper) by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing operations to produce image data for recording purposes; recording light that has been modulated in accordance with the image data is used to scan and expose a light-sensitive material to record a latent image, which is subsequently developed to produce a (finished) print. The printer operating on this principle has been commercialized as a digital photoprinter.

In the digital photoprinter, images can be processed as digital image data, so not only the assembling of images and the splitting of a single image into plural images but also the composition of characters can be performed by processing the image data and, as a result, prints can be outputted after various editing and/or processing operations have been performed in accordance with specific uses. Outputting images as prints (photographs) is not the sole capability of the digital photoprinter; the image data can be supplied into a computer or the like and stored in recording media such as a floppy disk; hence, the image data can be put to various non-photographic uses.

Having these features, the digital photoprinter is basically composed of the following units: a scanner (image reading apparatus) that reads the image on a film photoelectrically; an image processing apparatus that processes the captured image to produce output image data; and a printer (printer/processor) that records a latent image on a light-sensitive material by scan exposing it in accordance with the image data supplied from the image processing apparatus and which then performs development and other necessary processing on the exposed light-sensitive material to produce a (finished) print.

In the scanner, reading light issuing from a light source is allowed to be incident on a film, from which projected light bearing the image recorded on the film is produced and focused by an imaging lens to form a sharp image on an image sensor such as a CCD sensor; the image is then captured by photoelectric conversion and sent to the image processing apparatus as data for the image on the film after being optionally subjected to various image processing steps.

In the image processing apparatus, image processing conditions are set on the basis of the image data captured with the scanner and image processing as determined by the thus set conditions is performed on the captured image data and the resulting output image data for image recording (i.e., exposing conditions) are sent to the printer.

In the printer, if it is of a type that relies upon exposure by scanning with an optical beam, the latter is modulated in accordance with the image data sent from the image processing apparatus and deflected in a main scanning direction as the light-sensitive material is transported in an auxiliary scanning direction perpendicular to the main scanning direction, whereby a latent image is formed as the result of exposure (printing) of the light-sensitive material with the image bearing optical beam. In the processor, development and other processing as determined or by the light-sensitive material are performed to produce a print (photograph) reproducing the image that was recorded on the film.

Thus, in the digital photoprinter, the image on a film is read photoelectrically to acquire digital image data (density data), which is analyzed to determine the state of the image so that image processing conditions suitable for the image are set and the film image data is processed under the thus set conditions, thereby producing exposing conditions for printing, namely, output image data. Having these features, the digital photoprinter is capable of performing effective image processing operations such as the correction of washed-out highlights or flat (dull) shadows due to the taking of pictures with back light or an electronic flash, sharpening and the correction of color or density failures and this enables the production of high-quality prints that reproduce images of the quality that has been impossible to achieve by the conventional direct exposure technique.

However, even the digital photoprinter is not without a defect. The images recorded on films represent various scenes including humans, landscapes and flowers, so the image processing conditions that are set by analyzing the image data obtained by photoelectrically reading the image are not necessarily optimal for the image.

SUMMARY OF THE INVENTION

An object, therefore, of the present invention is to provide a digital image processing method for use with digital photoprinters that is capable of setting optimal image processing conditions for various images such as the ones recorded on films and which is capable of consistent outputting of prints reproducing high-quality images in correspondence with various scenes in the images.

The stated object of the invention can be attained by an image processing method for setting image processing conditions using image data supplied from an image data supply source, including the steps of:

acquiring scene information which is previously tagged on to the image data together with the image data; and setting the image processing conditions in accordance with the scene information.

Preferably, the scene information tagged on to the image data is a magnetic or optical record on a film.

Preferably, the scene information is automatically acquired by reading the magnetic or optical record on the film with magnetic or optical reading means, respectively.

Preferably, the scene information is at least one selected from the group consisting of a human individual, a flower, a landscape, a night view, an indoor view, a firework, a snow, a setting sun, a rising sun and a still object.

Preferably, the scene information is a standardized classification data value of the scene information which is keyed to an image content of the image data.

Preferably, the scene information is a registered classification data value of the scene information which is set and keyed to an image content of the image data.

It is preferred that the image processing method further include the steps of:

setting an image sequence in a plurality of images to be recorded on an index print in accordance with scene information; and producing the index print on which a plurality of the images are recorded in accordance with the image sequence.

The stated object can also be attained by a second aspect of the invention which relates to an image processing method for producing an index print on which a plurality of images are recorded using image data supplied from an image data supply source, including the step of:

setting an image sequence in the plurality of the images recorded on said index print in accordance with scene information which is previously tagged on to the image data of each of the plurality of the images.

BRIEF DESCRIPTION OF THE DRAWINGS

FIG. 4 is a block diagram of the image processing apparatus in the digital photoprinter shown in FIG. 1.

DETAILED DESCRIPTION OF THE INVENTION

The image processing method of the invention is now described in detail with reference to the preferred embodiments shown in the accompanying drawings.

Figure 1:
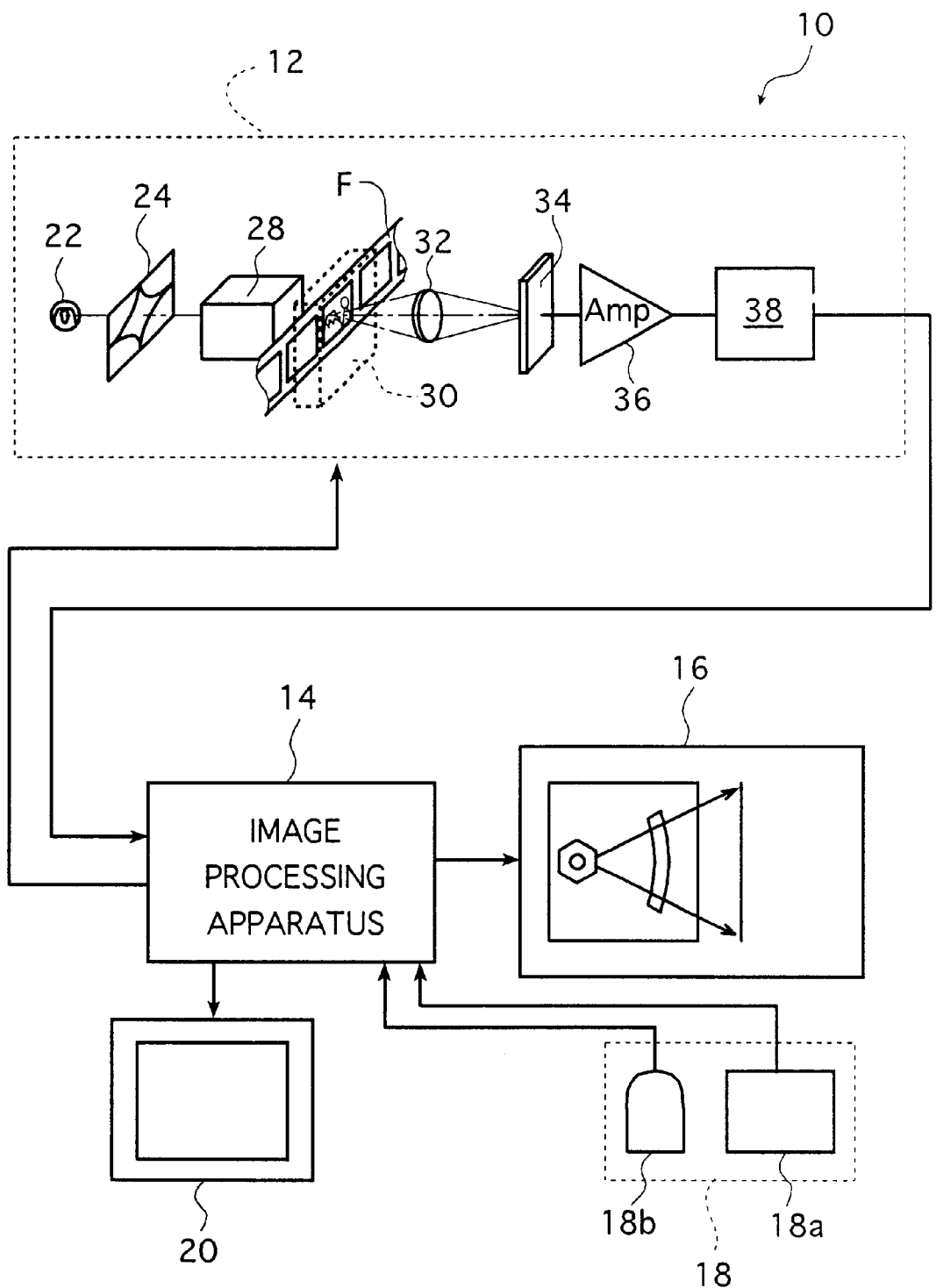
FIG. 1 is a block diagram of a digital photoprinter using an example of the image processing method of the invention.

FIG. 1 is a block diagram of an exemplary digital photoprinter using the image processing method of the invention. The digital photoprinter shown in FIG. 1 (which is hereunder referred to simply as "photoprinter 10") comprises basically a scanner (image reading apparatus) 12 for photoelectrically reading the image recorded on a film F, an image processing apparatus 14 which performs image processing on the thus read image data (image information) and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a (finished) print.

Connected to the image processing apparatus 14 are a manipulating unit 18 having a keyboard 18a and a mouse 18b for inputting (setting) various conditions, selecting and commanding a specific processing step and entering a command and so forth for effecting color/density correction, as well as a display 20 for representing the image captured with the scanner 12, various manipulative commands and pictures for setting and registering various conditions.

It should be noted that the applicability of the image processing method of the invention is not limited to the digital photoprinter described above; it is also applicable with advantage to the conventional analog photoprinter relying upon direct exposure in which the image recorded on a film is read photoelectrically with a CCD sensor or other image sensor, image processing conditions (exposing conditions) such as the quantity of exposing light (e.g. the stop-down value) and the quantities of color adjustments (e.g. the amount of insertion of color filters) are set on the basis of the obtained image data, and a light-sensitive material is exposed with the projected light from the film.

The scanner 12 is an apparatus with which the images recorded on the film F are read photoelectrically frame by frame. It comprises a light source 22, a variable diaphragm 24, a diffuser box 28 which diffuses the reading light incident on the film F so that it becomes uniform across the plane of the film F, an imaging lens unit 32, an image sensor 34 having line CCD sensors capable of reading R (red), G (green) and B (blue) images, an amplifier (Amp) 36 and an A/D (analog/digital) converter 38.

In the photoprinter 10, dedicated carriers are available that can be loaded into the body of the scanner 12 in accordance with the type or the size of the film used (e.g. whether it is a film of the Advanced Photo System (APS) or a negative or reversal film of 135 size), the format of the film (e.g. whether it is a strip or a slide) or other factor. By replacing one carrier with another, the photoprinter 10 can be adapted to process various kinds of films in various modes. The images (frames) that are recorded on the film and which are subjected to the necessary procedure for print production are transported to and held in a specified reading position by means of the carriers.

The scanner 12 captures the images recorded on the film F in the following manner; the reading light from the light source 22 has its quantity adjusted by means of the variable diaphragm 24 and is incident on the film F held in the specified reading position by means of the carrier and thereafter passes through the film to produce projected light bearing the image recorded on the film F.

Figure 2A:
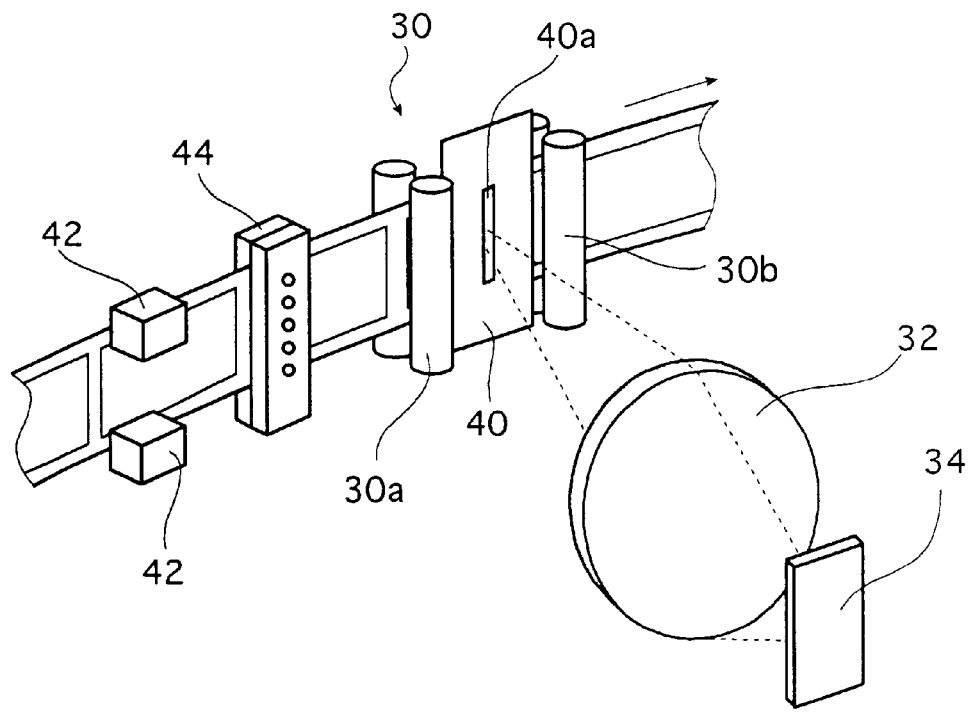
FIG. 2A is a schematic perspective view for illustrating the carrier to be installed in the digital photoprinter shown in FIG. 1.

The illustrated carrier 30 is adapted to handle films F of APS (or their cartridge). As shown schematically in FIG. 2A, the carrier 30 has a pair of transport roller pairs 30a and 30b and a mask 40 having a slit 40a. The transport rollers 30a and 30b are provided on opposite sides of the specified reading position in an auxiliary scanning direction which is perpendicular to the main scanning direction (i.e., the direction in which the line CCD sensors in the image sensor 34 extend) and they transport the film F with its length being parallel to the auxiliary scanning direction as it is in registry with the reading position. The slit 40a defines the projected light from the film F to have a specified narrow shape, is in registry with the reading position and extends in the main scanning direction.

Being held in registry with the reading position, the film F is transported in the auxiliary scanning direction by means of the carrier 30 as it is illuminated with the reading light. Consequently, the film F is subjected to two-dimensional slit scan with the reading light passing through the slit 40a extending in the main scanning direction, whereupon the image of each frame recorded on the film F is captured.

As is well known, magnetic recording media are preliminarily formed on an APS film to record various kinds of information. In addition, a magnetic information recording and reading means that is provided on a camera, a developing machine and the carrier 30 writes various kinds of information to the magnetic recording media or reads them from the media.

Figure 3:
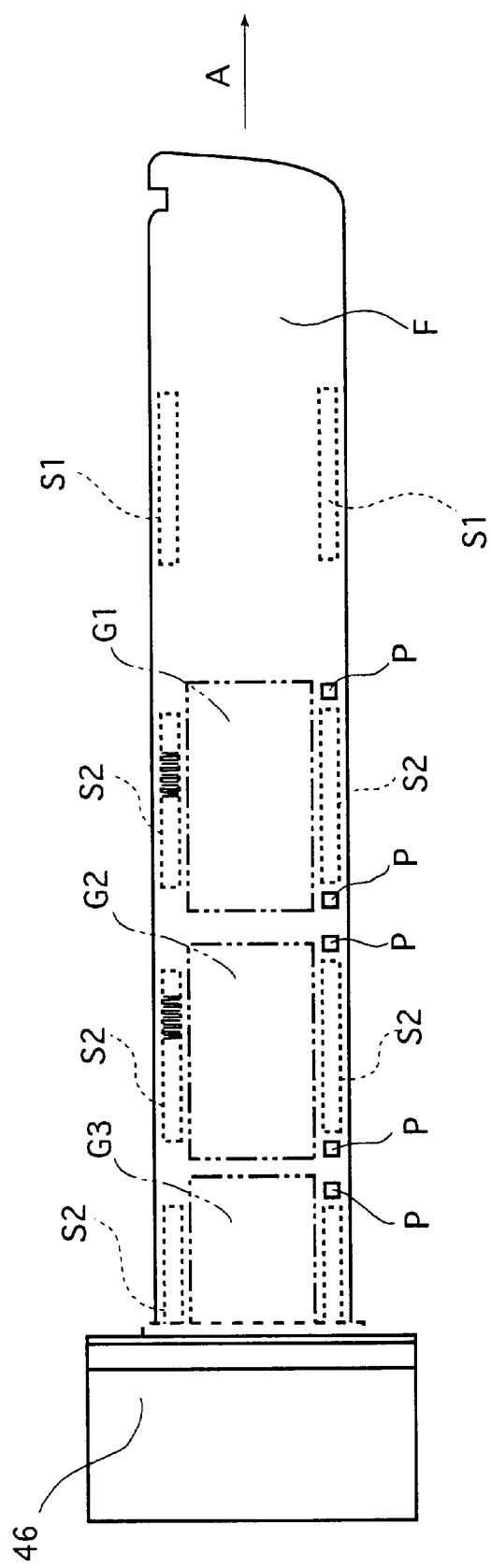
FIG. 3 shows schematically a film of an Advanced Photo System (APS)

As FIG. 3 shows in conceptual form, an APS film F has a clear magnetic recording medium S formed in the following regions along its length (in the auxiliary scanning direction): a specified region downstream of the leading frame G1 in the direction in which the film F is unwound from the cartridge (in the direction of arrow A), regions corresponding to respective frames G and a specified region upstream of the trailing frame (not shown), particularly near both edges of the film width (in the main scanning direction).

Information about the film F taken as a whole such as cartridge ID, film type, sensitivity and the date of development are magnetically recorded in the magnetic recording media S1 near the leading (or trailing) end of the film F, and information about each frame such as the date of taking the picture, the presence or absence of light emission from an electronic flash when taking the picture and the title are recorded in the magnetic recording media S2 in the individual frame regions. In principle, camera-related information is recorded on one side of the width of the magnetic recording medium S whereas lab-related information is recorded on the other side.

Indicated by 46 in FIG. 3 is a cartridge housing for containing the film F and indicated by P are perforations for assisting in the transport (feeding and rewinding) of the film F.

In the image processing method of the invention, the magnetic recording media S2 in the individual frame regions are utilized to tag scene information representing the scenes in the recorded images and such scene information is optionally recorded by the magnetic recording means in the camera when taking pictures.

The carrier 30 adapted to handle the APS film F also has two magnetic heads 42 that read the information recorded on the magnetic recording media S and which also record the necessary information. If the magnetic recording medium S2 near the frame from which image is to be captured has a record of scene information, the associated magnetic head 42 reads that information and sends it from the scanner 12 to the image processing apparatus 14.

All kinds of films including conventional films of 135 size and APS films are provided with records of various bar codes such as DX code, expanded DX code and FNS code for representing film type, sensitivity, frame number and other kinds of information. A code reader 44 for optically reading such bar codes is provided in the carrier 30 between the mask 40 and each of the magnetic heads 42. Code readers for reading such bar codes recorded in films are provided not only in the carrier 30 for APS but also in any conventional film carriers.

In the image processing method of the invention, scene information may be optically recorded either in bar codes or as optically readable symbols in areas other than the image regions of the individual frames of the film so that the recorded scene information is read with the code reader 44 or by some other suitable means to be sent from the scanner 12 to the image processing apparatus 14.

The method of recording the scene information on the film is not limited in any particular way and is provided in various kinds of camera for recording dates on the film, the scene information may be printed using a liquid-crystal display or the like when taking pictures or on any other suitable occasions.

The scene information that can be recorded on the film is not limited to any particular type and may be exemplified by human individuals, flowers, landscapes, night views, indoor views, fireworks, snow, the setting sun, the rising sun and still objects. Human individuals, landscapes and indoor views may be divided into groups for finer settings, such as taking with back light or close-ups (for human individuals), sea or mountain (for landscapes), and taking under a fluorescent or tungsten lamp (for indoor views).

The scene information may be standardized by keying its classification data value to the contents of the image or registered at a lab shop by customers who set arbitrary classification data value of the scene information and key it to the contents of the image; the two methods may be used in combination. If standardization is to be performed, uniform standards are preferably adopted by camera manufacturers and the like.

It should also be noted that the scene information is preferably rendered to ID codes in both letters and numbers so that the film can be easily tagged with ID information (easy data entry).

Using the image processing method of the invention, the photoprinter 10 sets image processing conditions in accordance with the scene information. This point will be discussed later in detail. It suffices here to say that the scene information to be tagged on one frame (or image) is not limited to one.

Figure 2B:
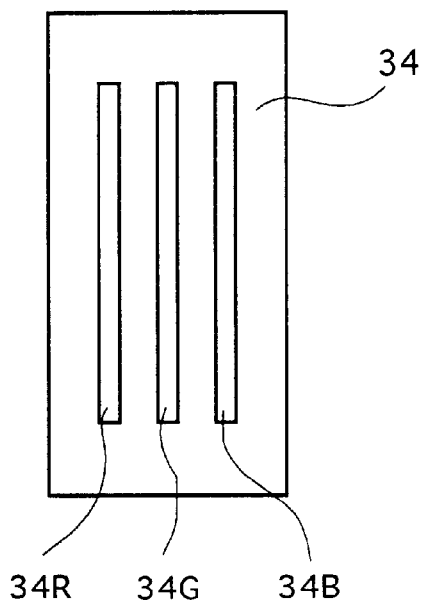
FIG. 2B shows in conceptual form the image sensor in the digital photoprinter shown in FIG. 1.

As already mentioned, the reading light passes through the film F held on the carrier 30 and the resulting image bearing, projected light is focused by the imaging lens unit 32 to form a sharp image on the light-receiving plane of the image sensor 34. As shown in FIG. 2B, the image sensor 34 is a 3-line color CCD sensor comprising a line CCD sensor 34R for reading a R image, a line CCD sensor 34G for reading a G image, and a line CCD sensor 34B for reading a B image. As already mentioned, the respective line CCD sensors extend in the main scanning direction. The projected light from the film F is separated into three primary colors R, G and B and captured photoelectrically by means of the image sensor 34.

The output signals from the image sensor 34 are amplified with Amp 36, converted to digital form in A/D converter 38 and sent to the image processing apparatus 14.

In the scanner 12, the images recorded on the film F are captured by two scans, the first being prescan at low resolution and the second being fine scan for obtaining output image data. Prescan is performed under preset reading conditions that ensure that the images on all films to be handled by the scanner 12 can be read without saturating the image sensor 34. Fine scan uses the prescanned data and is performed under reading conditions that are set for each frame such that the image sensor 34 is saturated at a slightly lower density than the minimum density of the image (frame) of interest. The output signals for prescan and fine scan are essentially the same data except for resolution and output levels.

It should be noted that the scanner to be used in the photoprinter using the image processing method of the invention is not limited to a type that relies upon the slit scan technique described above but that it may be of a type that relies upon areal exposure, or a technique by which the image in one frame is scanned across at a time. In this alternative approach, an area CCD sensor may be used by inserting R, G and B color filters between the light source and the film F. Image capturing with the area CCD sensor is performed with R, G and B color filters being sequentially inserted to color separate the image recorded on the film.

In the image processing method of the invention, the image data supply source is not limited to the above illustrated film reading scanner 12 and various substitutes may be mentioned, such as scanners reading reflection originals, imaging devices as exemplified by a digital camera and a digital video camera, on-line communication systems such as the Internet and a local area network, and recording media (or means of writing information to media or reading information from media) such as MO disks. In these alternative image data supply sources, scene information may be tagged as a record on the header or the like of the image file.

As already mentioned, the digital signals outputted from the scanner 12 (i.e., the image data supplied from the image data supply source) are fed into the image processing apparatus 14 (which is hereinafter referred to as "processing apparatus 14").

FIG. 4 is a block diagram of the processing apparatus 14, which includes a data processing section 48, a log converter 50, a prescan (frame) memory 52, a fine scan (frame) memory 54, a prescanned image processing section 56, a fine scanned image processing section 58, and a condition setting section 60.

FIG. 4 shows only the sites related to image processing and besides these sites, the processing apparatus 14 includes a CPU for controlling and managing the overall operation of the photoprinter 10 including the processing apparatus 14, memories for storing the information necessary for the operation and otherwise of the photoprinter 10. The manipulating unit 18 and the display 20 are connected to related sites via the CPU and the like (CPU bus).

The R, G and B digital signals outputted from the scanner 12 are sent to the data processing section 48, where they are subjected to specified data processing steps such as dark correction, defective image correction and shading correction. Thereafter, the processed digital signals are transferred into the log converter 50, where they are converted to digital form (density data), of which prescanned data is stored in the prescan memory 52 and fine scanned data is stored in the fine scan memory 54.

The prescanned data stored in the prescan memory 52 is read into the prescanned image processing section 56 having an image data processing subsection 62 (hereinafter referred to as "processing subsection 62") and an image data converting subsection 64 whereas the fine scanned data stored in the fine scan memory 54 is read into the fine scanned image processing section 58 having an image data processing subsection 66 (hereinafter referred to as "processing subsection 66") and an image data converting subsection 68.

The processing subsection 62 in the prescanned image processing section 56 and the processing subsection 66 in the fine scanned image processing section 58 are the sites where the image (image data) captured with the scanner 12 is subjected to specified image processing steps in accordance with the conditions that are set by the condition setting section 60 to be described later in this specification. The two processing subsections 62 and 66 perform basically the same processing except for resolution and the following explanation is directed to the processing subsection 66 taken as a typical example.

The processing subsection 66 (or 62) is basically composed of a first processing block 66A (or 62A), a second processing block 66B (or 62B) and a third processing block 66C (or 62C). The first processing block 66A is the site of performing gray balance adjustment, tonal correction, density (lightness) adjustment and so forth. These processing steps are performed using LUTs (look-up tables) for the respective adjustments or corrections, preferably processing the image data with cascaded LUTs in succession. The second processing block 66B is the site where the saturation adjustment (color adjustment) of the image including the correction for the kind of light source used in taking the picture (e.g. whether it was taken with an electronic flash or under a fluorescent lamp) is performed by matrix (MTX) operations. The third processing block 66C performs other processing steps such as electronic magnification, dodging (compressing/extending the density's dynamic range) and sharpening (sharpness correction); using a low-pass filter, an adder, LUT, MTX, etc., the third processing block 66C performs these processing steps by known methods such as averaging and interpolation.

The conditions for the image processing steps to be performed in these processing blocks 62A–62C and 66A–66C are set in the condition setting section 60 which is described later.

The image data converting subsection 68 is a site where the image data processed by the processing subsection 66 is converted with a 3D (three-dimensional) LUT or the like into image data that is subsequently supplied into the printer 16 as image data corresponding to image recording with the printer 16.

The image data converting subsection 64 optionally thins out the image data processed by the processing subsection 62 and similarly converts the image data with a 3D-LUT or the like into image data that corresponds to the representation on the display 20 and which is subsequently displayed on the display 20.

The conditions for the processing to be done in the two image data converting subsections 64 and 68 are set in the condition setting section 60 which is described later.

The condition setting section 60 determines which image processing should be done in the prescanned image processing section 56 and the fine scanned image processing section 58 and sets the conditions for the determined processing. The condition setting section 60 includes a setup subsection 72, a key correcting subsection 74, a parameter coordinating subsection 76 and a processed information storing subsection 70. The setup subsection 72 uses the prescanned data or the like to set the reading conditions for fine scan and supplies them to the scanner 12; in addition, the setup subsection 72 constructs (or calculates) the conditions for the image processing steps to be done in the prescanned image processing section 56 and the fine scanned image processing section 58 and supplies them to the parameter coordinating subsection 76.

Specifically, the setup subsection 72 reads the prescanned data from the prescan memory 52 and uses it to perform various operations including the construction of density histograms and calculation of various image characteristic quantities such as average density, highlights (minimum density) and shadows (maximum density), thereby determining the reading conditions for fine scan. In addition to the construction of density histograms and the calculation of image characteristic quantities, the setup subsection 72, in response to commands optionally entered by the operator, sets the conditions for the various image processing steps to be done in the prescanned image processing section 56 and the fine scanned image processing section 58, as by constructing LUTs for gray balance adjustment, tonal correction and density adjustment, constructing MTX operational formulae and calculating coefficients for sharpness correction.

In the photoprinter 10 using the image processing method of the invention, if the frames (or images) to be processed are in a film with a record of scene information or contain image data that has been outputted from a digital camera or the like to be tagged with scene information, the conditions for the image processing to be done in the aforementioned processing subsection 66 (or 62) are set in accordance with the scene information such as to produce conditions that are preset to give an appropriately finished image of the scene. In short, the image processing algorithm is altered in accordance with the scene information.

In the illustrated case, the setup subsection 72 is connected to the processed information storing subsection 70 which stores the information about the image processing conditions suitable for the scene information of interest. The information captured with the carrier 30 (magnetic heads 42) in the scanner 12 is also supplied to the setup subsection 72. If the supplied magnetic information enables the setup subsection 72 to conclude that the frame of interest has been tagged with scene information (and recorded on the film F), the setup subsection 72 reads the information about the associated image processing conditions from the processed information storing subsection 70 and sets the image processing conditions represented by that information.

The associated image processing conditions (those which are suitable for the scene information of interest) are not limited in any particular way and may be set as appropriate for various scenes such that the image reproduced on the output print is given a good finish.

Take, for example, the case where "a human individual" is tagged as scene information. The setup subsection 72 performs face extraction, or extracts the face of the person and, particularly for the purpose of giving a beautiful finish to the complexion of the face region, it controls various image processing conditions such as the overall density of the image in order to ensure the appropriate density in the face region; the setup subsection 72 also sets the MTX operational formulae for saturation correction to be performed in the second processing block 66B and controls the LUTs and so forth in the third processing block 66C in order to dodge the face region.

The method of face extraction is not limited in any particular way and known face extracting algorithms may be employed. A specific example is described in Unexamined Published Japanese Patent Application (kokai) No. 138470/1997 and consists of the following steps: weights are determined by preliminary evaluation of different methods of extracting a principal area such as ones of extracting a specific color (complexion), extracting a specific geometric pattern and removing a region which presumably corresponds to the background, and the principal areas are extracted by these methods and weighted by the predetermined weights and the most appropriate principal area is found from the result of weighting and extracted. Other methods of face extraction are described in Unexamined Published Japanese Patent Application (kokai) Nos. 346333/1992, 158164/1993, 165120/1993, 160993/1994, 184925/1996, 101579/1997, 138471/1997, etc. and they are also useful with advantage.

If "a flower" is tagged as scene information, the setup subsection 72 extracts a region of high saturation and sets MTX operational formulae for saturation correction and the like in order to enhance the saturation of the extracted region, thereby providing a brilliant picture.

If "a landscape" is tagged as scene information, the setup subsection 72 does not correct for the type of light source but sets LUTs for gray balance correction, MTX operational formulae for saturation correction and the like in order to give a beautiful finish to greens and the sky.

If "night view" or "fireworks" is tagged as scene information, the setup subsection 72 sets LUTs for tonal correction and the like in order to provide a high-contrast image with enhanced lightness and darkness.

If "indoor view" is tagged as scene information, the setup subsection 72 sets MTX operational formulae for saturation correction and the like in order to apply rather intense correction for the type of light source.

In the image processing method of the invention, a plurality of image processing algorithms according to such specified kinds of scene information are preliminarily provided as a unit and processing is executed in accordance with the scene information tagged on the image of interest.

If desired, combinations of image processing algorithms (or turning on and off of processing) or their weights may preliminarily be determined according to various kinds of scene information and processing is executed in accordance with the scene information tagged on the image of interest.

The key correcting subsection 74 calculates the amounts of adjustment of image processing conditions (e.g. the amount of correction of LUTs) typically in accordance with various commands entered means of keys for adjusting the density (brightness), color, contrast, sharpness, saturation and so forth that have been set in the keyboard 18a or by the mouse 18b; the key correcting subsection 74 then supplies the calculated amounts of adjustment into the parameter coordinating subsection 76.

After receiving the image processing conditions such as LUTs and MTX operational formulae that have been set by the setup subsection 72, the parameter coordinating subsection 76 sets them in the prescanned image processing section 56 and the fine scanned image processing section 58. Further, in accordance with the amounts of adjustment calculated by the key correcting subsection 74, the parameter coordinating subsection 76 either corrects (adjusts) the image processing conditions set in various parts or makes another setting of image processing conditions.

A customer who ordered simultaneous prints in APS will be given not only the ordered prints but also an index print reproducing the images in all frames that were recorded on the film F. An increasing number of lab shops offer, free of charge, similar index prints for ordinary films of 135 size.

In the image processing method of the invention, an index print may be edited using the kinds of scene information tagged on individual frames. This editing process enables the photographer to classify the recorded images in a desired way, thereby providing greater convenience in putting the prints (image files) in order.

Figure 5A:
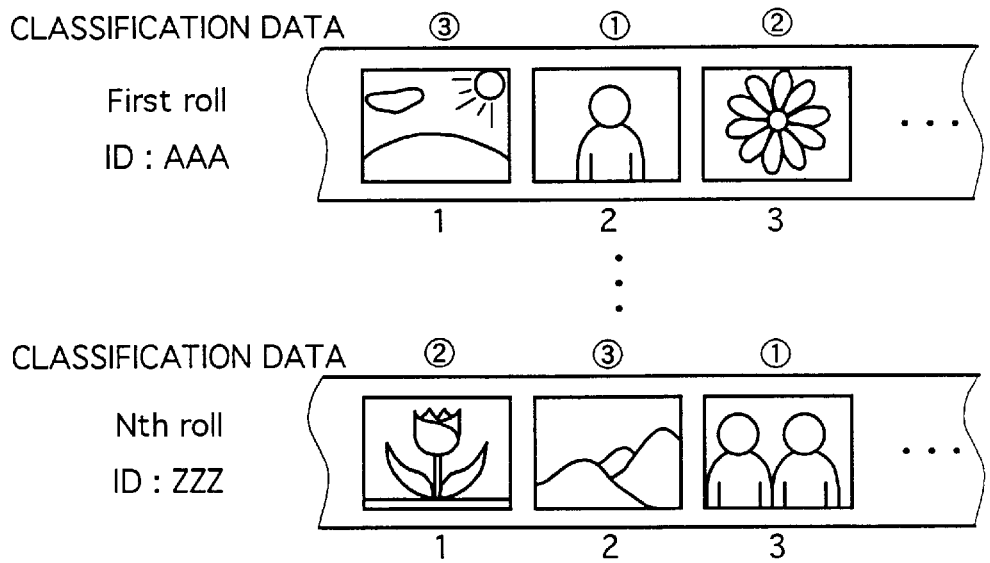
FIGS. 5A and 5B show in conceptual form two steps in the method of producing an index print using the image processing method of the invention.
Figure 5B:
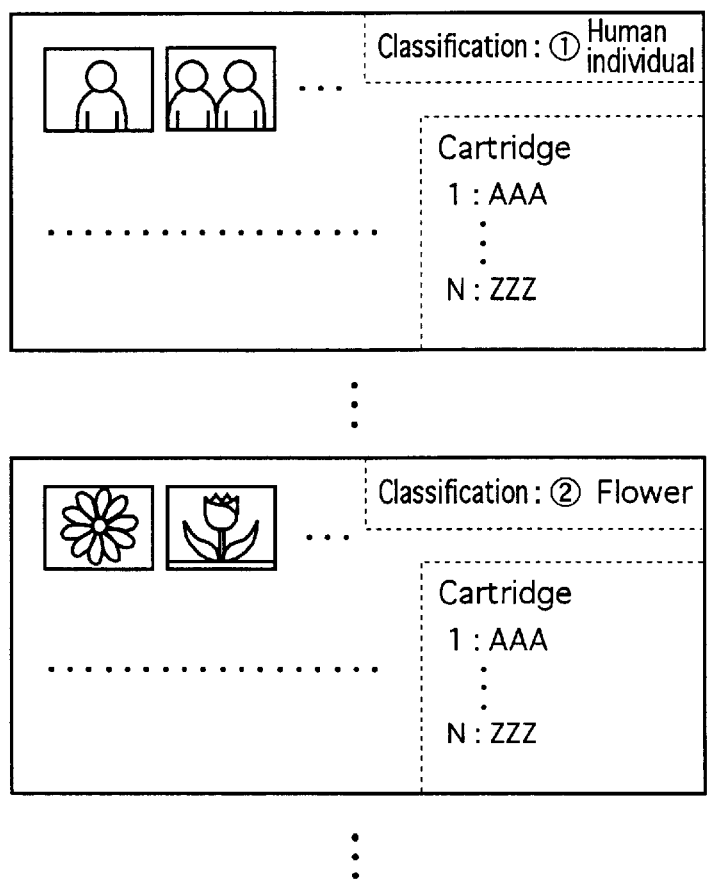

Consider the case where a lab shop is ordered to prepare prints from one or more (N) rolls of film that have been tagged with various kinds of scene information. As shown in FIG. 5A, the lab shop first classifies the individual frames into groups in accordance with scene information (in the illustrated case, group (1) is for human individuals, group (2) for flowers and group (3) for landscapes). The lab shop may then output different index prints for different groups (see FIG. 5B). Classifications on index prints and the designations of cartridge ID may be recorded by back printing.

If desired, one or more index prints may be outputted after editing images of the same group so that they are included in a single set or arranged in sequence.

Alternatively, the individual frames may be classified into groups not by scene information but by the date or time of taking pictures (e.g. whether it was in the morning or afternoon). If desired, the data about the photographer may be used to classify the frames into groups. In the latter case, the data about the photographer is entered into the camera or the photographer's ID card is set in the camera or any other suitable method may be used to have such ID information magnetically recorded or printed optically on the individual APS films or in successive frames.

Classification may also be effected using the information about the taking of pictures (particularly about the camera)

such as magnification or the presence or absence of light emission from an electronic flash, image characteristic quantities and so forth. For example, thresholds of magnification, the lightness of a particular scene (e.g. its average density) and other factors may be set stepwise and the individual frames are classified into groups in accordance with successive settings.

According to another approach, a parameter that determines the order of arranging frames in each group in accordance with the date and time of taking pictures, magnification and so forth may be designated.

The above-described methods of classifying the frames into groups or editing them are also very effective in outputting image data to various recording media including magnetic recording media such as floppy disks, magneto-optical recording media such as MO disks and optical recording media such as CD-ROMs.

We now describe the image processing method of the invention in greater detail by explaining the operations of the scanner 12 and the processing apparatus 14.

The illustrated film F is compatible with the APS and the photographer of pictures (prior to placing an order for the preparation of prints) magnetically records scene information in the magnetic recording medium S2 in each frame of the film F by input devices typically provided in the camera.

At the request of the photographer, the operator loads the scanner 12 with a carrier 30 that is associated with the film F, sets the film F (or its cartridge to be more exact) in a specified position on the carrier 30, enters the necessary information such as the size of the prints to be prepared, and thereafter keys in a command for starting print preparation.

In response to the START command, the stop-down value (aperture size) of the variable diaphragm 24 in the scanner 12 and the storage time of the image sensor (line CCD sensors) 34 are set in accordance with the reading conditions for prescan; thereafter, the carrier 30 unwinds the film F from the cartridge and transports it in the auxiliary scanning direction at a specified speed to start prescan; as already mentioned, the film F is subjected to slit scan in the specified reading position and the projected light is focused on the image sensor 34 so that the image recorded on the film F is captured photoelectrically as R, G and B separations.

During the transport of the film F, the magnetic heads 42 read the magnetic information recorded in the magnetic recording media S and the code reader 44 reads bar codes such as DX code, whereupon the necessary information is sent to a specified site. In the case under discussion, the scene information for each frame is detected from the magnetic information recorded in the magnetic recording media S2 and supplied to the setup subsection 72.

In the present invention, both prescan and fine scan may be performed frame by frame. Alternatively, all frames may successively be subjected to prescan and fine scan. If desired, prescan and fine scan may continuously be performed on frame groups each consisting of a given number of frames. On the pages that follow, the case of reading the image in one frame is described for the sake of simplicity.

The output signals produced from the image sensor 34 by prescan are amplified by Amp 36 and sent to the A/D converter 38, where they are converted to digital form. The digital signals are sent to the processing apparatus 14, where they are given specified data processing steps in the data processing section 48 and converted to prescanned data (digital image data) in the log converter 50, with the prescanned data being then stored in the prescan memory 52.

The setup subsection 72 in the condition setting section 60 reads the stored prescanned data out of the prescan memory 52, constructs density histograms, calculates image characteristic quantities such as highlights and shadows and performs any other necessary operations to set the reading conditions for fine scan, which are then supplied to the scanner 12.

Setting the image processing conditions is not the only function of the setup subsection 72. As already mentioned, the scanner 12 (carrier 30 to be more exact) supplies the setup subsection 72 with the magnetic information captured from the film F. Hence, the setup subsection 72 detects scene information from the supplied magnetic information, reads the information about the associated image processing conditions from the processed information storing subsection 70 and, in accordance with the thus read information, uses the constructed density histograms and the calculated image characteristic quantities, sometimes in combination with optionally entered operator's commands, sets the conditions for the image processing steps to be performed in the first, second and third processing blocks 66A–66C in the processing subsection 66, and supplies the settings into the parameter coordinating subsection 76.

If "a human individual" is tagged as scene information, the setup subsection 72 performs face extraction and in order to give a beautiful finish to the complexion of the face region, sets the conditions for various image processing steps, as exemplified by the adjustment of overall density, MTX operational formulae for saturation correction that are set in the second processing block 66B and the conditions for dodging to be performed in the third processing block 66C.

Upon receiving the image processing conditions, the parameter coordinating subsection 76 sets them at a specified site (hardware) in the prescanned image processing section 56 and the fine scanned image processing section 58.

If verification is to be performed, the processing subsection 62 reads the prescanned data from the prescan memory 52, processes it in the respective blocks and subsequently converts the processed data to a suitable form in the image data converting subsection 64. The converted data is represented as a simulated image on the display 20.

Looking at the representation on the display 20, the operator checks (verifies) the image, or the result of the processing and, if necessary, manipulates the aforementioned keys on the keyboard 18a or the mouse 18b to adjust the color, density, gradation and other features of the image.

The inputs for this adjustment are sent to the key correcting subsection 74 which, in response to the entered inputs for adjustment, calculates the amounts of correction of the image processing conditions and sends them to the parameter coordinating subsection 76. In response to the supplied amounts of correction, the parameter coordinating subsection 76 corrects the LUTs, MTXs and other conditions in the processing subsections 62 and 66 as already described above. The image represented on the display 20 also varies in response to this corrective measure, or the inputs for adjustment entered by the operator.

If the operator concludes that the image in the frame of interest represented on the display is appropriate (verification OK), he or she manipulates the keyboard 18a or the mouse 18b to give a command for print start, whereupon the image processing conditions are finalized and set in the scanner 12 in accordance with the reading conditions for fine scan including the stop-down value of the variable diaphragm 24 and, at the same time, carrier 30 transports the film F at a suitable speed, whereby fine scan gets started.

If no image verification is to be performed, the image processing conditions are finalized at the point of time when the parameter coordinating subsection 76 ends setting of the image processing conditions in the processing subsection 66 of the fine scanned image processing section 58, and fine scan gets started.

Fine scan is performed in essentially the same manner as prescan except that the reading conditions are those for fine scan including the stop-down value of the variable diaphragm 24; the output signals from the image sensor 34 are amplified with Amp 36, converted to digital form in the A/D converter 38, processed by the data processing section 48 in the processing apparatus 14, converted to fine scanned data in the log converter 50 and sent to the fine scan memory 54.

The fine scanned data being sent to the fine scan memory 54 is read by fine scanned image processing section 58, processed under the image processing conditions finalized in the respective blocks 66A–66C of the processing subsection in accordance with the image processing method 66 and subsequently converted to output image data in the image data converting subsection 68 before it is sent to the printer 16.

The printer 16 is the combination of a printer (exposing device) that records a latent image on a light-sensitive material (photographic paper) by exposing it in accordance with the supplied image data and a processor (developing device) that performs specified processing steps on the exposed light-sensitive material and which outputs it as a print. To give one example of the printer's operation, the light-sensitive material is cut to a specified length in accordance with the size of the final print; thereafter, the printer records a back print and three light beams for exposure to red (R), green (G) and blue (B) in accordance with the spectral sensitivity characteristics of the light-sensitive material are modulated in accordance with the image data outputted from the processing apparatus 14; the three modulated light beams are deflected in the main scanning direction while, at the same time, the light-sensitive material is transported in the auxiliary scanning direction perpendicular to the main scanning direction so as to record a latent image by two-dimensional scan exposure with said light beams. The latent image bearing light-sensitive material is then supplied to the processor. Receiving the light-sensitive material, the processor performs a wet development process comprising color development, bleach-fixing and rinsing; the thus processed light-sensitive material is dried to produce a finished print; a plurality of prints thus produced are sorted and stacked in specified units, say, one roll of film.

While the image processing method of the present invention has been described above in detail, it should be noted that the invention is by no means limited to the foregoing embodiments and various improvements and modifications may of course be made without departing from the scope and spirit of the invention.

As described above in detail, the present invention provides a digital image processing method that is particularly suitable for use with digital photoprinters and which can process image data under optimal conditions that are adapted to specific scenes in images such as the ones recorded on films. As a result, the method of the invention can produce high-quality prints that reproduce optimal images for various scenes.

What is claimed is:

1. An image processing method for setting image processing conditions using image data supplied from an image data supply source, comprising the steps of:

storing a plurality of processing conditions for a scene;

acquiring scene information, previously tagged with said image data, together with said image data, wherein said scene information includes information relating to the image content of an individual image frame from the image data supply source; and setting said image processing conditions in accordance with at least one stored processing condition corresponding to said acquired scene information for the individual image frame.

2. The image processing method according to claim 1, wherein said scene information tagged on to said image data is a magnetic or optical record on a film.

3. The image processing method according to claim 2, wherein said scene information is automatically acquired by reading said magnetic or optical record on the film with magnetic or optical reading means, respectively.

4. The image processing method according to claim 1, wherein said scene information includes at least one scene type selected from the group consisting of a human individual, a flower, a landscape, a night view, an indoor view, a firework, a snow, a setting sun, a rising sun and a still object, wherein said scene information designates the stored processing condition used to set said image processing conditions based on said at least one scene type.

5. The image processing method according to claim 1, wherein said scene information is a standardized classification data value of said scene information which is keyed to an image content of said image data.

6. The image processing method according to claim 1, wherein said scene information is a registered classification data value of said scene information which is set and keyed to an image content of said image data.

7. The image processing method according to claim 1, further comprising the steps of:

setting an image sequence in a plurality of images to be recorded on a index print in accordance with said scene information; and producing said index print on which said plurality of said images are recorded in accordance with said image sequence.

8. An image processing method comprising:

storing a plurality of processing conditions for a scene in a processed information storing subsection;

acquiring image data of an image from a first portion of an image data source and scene data from a second portion of the image data source, which is tagged with said image, wherein said scene data includes information relating to image content of an individual image frame from the image data source;

retrieving from said processed information storing subsection, at least one processing condition corresponding to said acquired scene data; and processing said acquired image data according to said retrieved processing condition.

9. An image processing apparatus comprising:

a scanner adapted to acquire image data and scene data from an image;

a processed information storing subsection containing a plurality of processing conditions for processing image data;

a setup subsection adapted to recognize the acquired scene data and acquire at least one corresponding processing condition from said processed information storing subsection, wherein said acquired scene data includes information relating to image content from the image; and an image data processing subsection adapted to process said image data according to said acquired at least one associated processing condition.

10. An image processing system comprising:

a camera adapted to permit a user to acquire an image and to tag said image with scene data;

a scanner adapted to acquire image data and scene data from said image;

a processed information storing subsection containing a plurality of processing conditions corresponding scene data;

a setup subsection adapted to recognize the acquired scene data and to acquire at least one corresponding processing condition from said processed information storing subsection, wherein said scene data includes information relating to the image content of an individual image; and an image data processing subsection adapted to process said image data according to said acquired at least one associated processing condition.

* * * * *